United States Patent
Wu et al.

(10) Patent No.: US 12,307,759 B2
(45) Date of Patent: May 20, 2025

(54) IMAGE DATA AUGMENTATION DEVICE AND METHOD

(71) Applicant: Realtek Semiconductor Corporation, Hsinchu (TW)

(72) Inventors: Chun-Chang Wu, Hsinchu (TW); Shih-Tse Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 456 days.

(21) Appl. No.: 17/529,431

(22) Filed: Nov. 18, 2021

(65) Prior Publication Data

US 2022/0269886 A1 Aug. 25, 2022

(30) Foreign Application Priority Data

Feb. 22, 2021 (TW) .................. 110106190

(51) Int. Cl.
*G06K 9/00* (2022.01)
*G06N 20/00* (2019.01)
*G06T 7/70* (2017.01)
*G06V 20/00* (2022.01)

(52) U.S. Cl.
CPC ............ *G06V 20/00* (2022.01); *G06N 20/00* (2019.01); *G06T 7/70* (2017.01)

(58) Field of Classification Search
CPC .......... G06N 20/00; G06N 3/09; G06T 11/00; G06T 7/70; G06V 10/22; G06V 10/774; G06V 10/82; G06V 20/00

See application file for complete search history.

(56) References Cited

U.S. PATENT DOCUMENTS

| | | | |
|---|---|---|---|
| 11,887,003 B1* | 1/2024 | Bopardikar | G06N 20/00 |
| 2021/0056456 A1* | 2/2021 | Kawas | G06F 17/18 |
| 2021/0117730 A1* | 4/2021 | Alsallakh | G06F 18/217 |
| 2021/0150764 A1* | 5/2021 | Kuo | G06N 3/04 |

OTHER PUBLICATIONS

Title={Synthesizing Training Data for Object Detection in Indoor Scenes}, author={Georgios Georgakis and Arsalan Mousavian and Alexander C. Berg and Jana Kosecka}, year={2017}, (Year: 2017).*

(Continued)

*Primary Examiner* — Michael J Vanchy, Jr.
(74) *Attorney, Agent, or Firm* — troutman pepper locke; Tim Tingkang Xia, Esq.

(57) ABSTRACT

An image data augmentation device includes a memory and a processor. The memory is configured to store multiple commands and multiple images; the processor is connected to the memory to read the multiple images and execute multiple commands to: identify at least one object-related image including at least one object from the multiple images; capture at least one object image from the at least one object related image; and superimpose the at least one object image on multiple arbitrary positions in the multiple images to generate multiple training sample images, and using the multiple training sample images to execute machine learning. In addition, an image data augmentation method is also disclosed here.

15 Claims, 8 Drawing Sheets

(56) References Cited

OTHER PUBLICATIONS

R. Qin and R. Wang, "Generative deep deconvolutional neural network for increasing and diversifying training data," 2018 IEEE International Conference on Imaging Systems and Techniques (IST), Krakow, Poland, 2018, pp. 1-6, doi: 10.1109/IST.2018.8577149. (Year: 2018).*
Xiao, Yuxuan et al., "Making of night vision: Object detection under low-illumination." IEEE Access, 8, (2020), p. 123075-123086. (Year: 2020).*
Daniel Mas Montserrat et al., "Training object detection and recognition CNN models using data augmentation," Electronic Imaging 2017, p. 27-36.
Xiao, Yuxuan et al., "Making of night vision: Object detection under low-illumination." IEEE Access, 8, (2020), p. 123075-123086.
Alex Krizhevsky et al, "ImagenNet Classification with Deep Convolutional Neural Networks", NIPS 2012.
Barret Zoph et al, "Learning Data Augmentation Strategies for Object Detection", arXiv:1906.11172v1 [cs.CV], Jun. 26, 2019.
Alexey Bochkovskiy et al, "YOLOv4: Optimal Speed and Accuracy of Object Detection", arXiv: 2004.10934v1 [cs.CV], Apr. 23, 2020.
Image augmentation for machine learning experiments, retrieved from https://github.com/aleju/imgaug, 2021.
Liang-Chieh Chen et al, "DeepLab: Semantic Image Segmentation with Deep Convolutional Nets, Atrous Convolution, and Fully Connected CRFs", arXiv: 1606.00915v2 [cs.CV], May 12, 2017.

* cited by examiner

IMAGE DATA AUGMENTATION DEVICE AND METHOD

CROSS-REFERENCE TO RELATED APPLICATION

This application claims priority to Taiwan Application Serial Number 110106190, filed Feb. 22, 2021, which is herein incorporated by reference in its entirety.

BACKGROUND

Field of Disclosure

The present disclosure relates to data augmentation technology. More particularly, the present disclosure relates to an image data augmentation device and method.

Description of Related Art

Recently, when training a machine learning model, in addition to the trained model architecture that affects the recognition and the recognition ability, the most important thing is the integrity of the training data. For the same model architecture, in the condition that the training database is more diverse and complete, the recognition ability of the model is usually higher (i.e., the recognition accuracy is higher). However, in practice, due to limited human resource and data, it is often impossible to collect a diverse and highly integrity database. Therefore, it is very important to be able to use the data augmentation (DA) method of auto-generated data, and choosing an appropriate data augmentation method will effectively improve the performance of training data by the model.

In general, when training an image recognition model for object recognition, a sufficient quantity of color images are often used as training data. However, when photographing images at night, a night-vision device is often used to photograph images without color information. At this time, if a model trained on color images is used to identify or detect images photographed by the night-vision device, the recognition accuracy is often poor. Notably, a quantity of images, which include specific objects, photographed at night is often insufficient (for example, the quantity of the images of human figures recognized at night is very small), and also affects the recognition accuracy. Or, when the quantity of the images, which include the specific objects, stored in the database is insufficient, using the recognition model trained from the images stored in the database for recognition or detection also causes poor recognition accuracy.

In summary, how to train the recognition model for the images photographed at night and how to solve the problem of insufficient quantity of the images, which include the specific objects, stored in the database are problems that those skilled in the art are eager to solve.

SUMMARY

The disclosure provides an image data augmentation device and method, which can eliminate a problem of training the recognition model for the images photographed at night difficultly and a problem of insufficient quantity of the images, which include specific objects, stored in a database.

According to the first aspect, an image data augmentation device is provided. The image data augmentation device comprises a memory and a processor. The memory configured to store a plurality of commands and a plurality of images; the processor connected to the memory and configured to read the plurality of images and execute the plurality of commands to: identify at least one object related image comprising at least one object from the plurality of images; capture at least one object image from the at least one object related image; and superimpose the at least one object image on a plurality of arbitrary positions in the plurality of images to generate a plurality of training sample images, and using the plurality of training sample images to execute machine learning.

According to the second aspect, an image data augmentation method. The image data augmentation method comprises: capturing at least one object image from at least one object related image comprising at least one object from a plurality of images; and superimposing the at least one object image on a plurality of arbitrary positions in the plurality of images to generate a plurality of training sample images, and using the plurality of training sample images to execute machine learning.

According to the third aspect, an image data augmentation device is provided. The image data augmentation device comprises a memory and a processor. The memory configured to store a plurality of commands and a plurality of images; the processor connected to the memory and configured to read the plurality of images and execute the plurality of commands to: identify at least one object related image comprising at least one object from the plurality of images; determine whether a quantity of the at least one object related image in the plurality of images is not more than an object related image quantity threshold; capture at least one object image from the at least one object related image when the quantity of the at least one object related image is not more than the object related image quantity threshold; and superimpose the at least one object image on a plurality of arbitrary positions in the plurality of images to generate a plurality of training sample images, and using the plurality of training sample images to execute machine learning.

Based on the above, the embodiment of the present disclosure can automatically or semi-automatically crop object images from multiple pre-stored images, so as to randomly collage the object images to images obtained by a night-vision device. In this way, a problem of poor recognition ability for the images captured by the night-vision device in the past can be solved. In addition, the problem of the poor recognition ability of a recognition model when a quantity of the stored images including the specific objects is insufficient can be solved.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
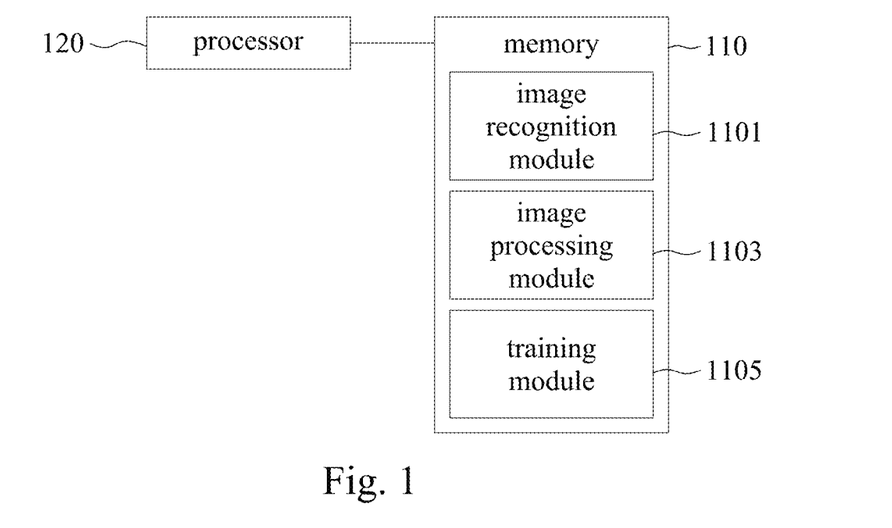
FIG. 1 is a block diagram of an image data augmentation device according to some embodiments of the present disclosure.

FIG. 1 is a block diagram of an image data augmentation device according to some embodiments of the present disclosure. Referring to FIG. 1, the image data augmentation device 100 can include a memory 110 and a processor 120. In some embodiments, the image data augmentation device 100 is an electronic device that can connect to the Internet, such as a smart phone, a tablet computer, a notebook computer, a desktop computer, etc., and there is no particular limitation. In addition, the memory 110 can store multiple commands and multiple images. Furthermore, the processor 120 is connected to the memory 110 and reads the multiple images, so as to load and execute the multiple commands.

In some embodiments, the memory 110 is, for example, any type of random access memory (RAM), read-only memory (ROM), flash memory, hard disk or similar components or a combination of the above components.

In some embodiments, the above-mentioned commands stored in the memory 110 can include an image recognition module 1101, an image processing module 1103, and a training module 1105. In some embodiments, the above-mentioned images stored in the memory 110 can be images photographed by a night-vision device (NVD) or images photographed by a generally common camera device. The images photographed by the night-vision device are, for example, digital night vision images, active infrared vision images, or thermographic images, etc. The images photographed by the generally common camera device are, for example, gray scale images, colorful images, or hyperspectral images, etc.

In some embodiments, the processor 120 is for example, central processing unit (CPU), or other programmable general-purpose or special-purpose of microprocessors, digital signal processors (DSP), programmable controllers, application specific integrated circuits (ASIC) or other similar devices or a combination of these devices.

In addition, the processor 120 can be communicatively connected to the memory 110. Regarding the above-mentioned communication connection method, the processor 120 can be connected to the memory 110 in a wired or wireless method, and there is no particular limitation herein.

For the wired method, the processor 120 can communicate through universal serial bus (USB), RS232, universal asynchronous receiver/transmitter (UART), internal integration Circuit (I2C), serial peripheral interface (SPI), display port, thunderbolt or local area network (LAN) interface connected method, and there is no particular limitation. For the wireless method, the processor 120 can communicate through wireless fidelity (Wi-Fi) module, radio frequency identification (RFID) module, Bluetooth module, infrared radiation (IR) module, near-field communication (NFC) module or device-to-device (D2D) module, and there is no particular limitation. In this embodiment, the processor 120 can load the above-mentioned multiple instructions from the memory 110 to execute the following image data augmentation method of the embodiment of the present disclosure.

Various usage scenarios of the image data augmentation device 100 according to the embodiment of the present disclosure can be described below. Taking the embodiment of training on the images photographed by the night-vision device as an example, after the night-vision device photographs the multiple images, the memory 110 stores the photographed images, and the image data augmentation device 100 uses the photographed images for data augmentation, thereby increasing a quantity of data for training the recognition model.

Figure 2:
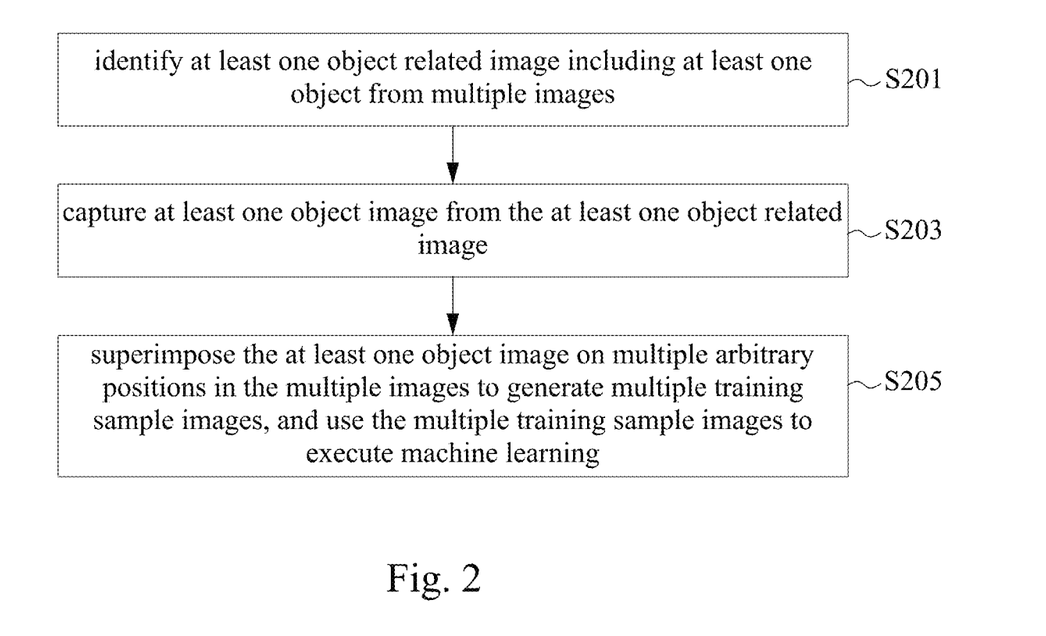
FIG. 2 is a flowchart of an image data augmentation method according to some embodiments of the present disclosure.

FIG. 2 is a flowchart of an image data augmentation method according to some embodiments of the present disclosure. The method of the embodiment shown in FIG. 2 is applicable to the image data augmentation device 100 of FIG. 1, but is not limited to this. For the sake of convenience and clarity, the following refers to FIG. 1 and FIG. 2 at the same time, and the detailed steps of the image data augmentation method shown in FIG. 2 are explained by the operation relationship between the components in the image data augmentation device 100.

First, in step S201, the processor 120 can identify at least one object related image including at least one object from the multiple images through the image recognition module 1101.

In other words, the processor 120 can read the image recognition module 1101 and the multiple images from the memory 110 to identify the at least one object related image from the multiple images through the image recognition module 1101, where the at least one object related image can include at least one object.

In some embodiments, the processor 120 can execute the above step S201 periodically or aperiodically.

Notably, the above-mentioned at least one object can be one or more types of specific objects that the user wants to identify from the images, and the specific object is various types of the objects such as a human shape, a car, or a house, etc., and there is no particular limitation on the object.

In addition, the multiple images stored in the memory 110 can not only include the at least one object related image, but also multiple background images, where none of the background images includes the at least one object. Furthermore, for the images photographed by the night-vision device, the quantity of the object related image is usually much less than the quantity of the background image (for example, the quantity of the background image is ten times the quantity of the object related image).

Figure 3A:
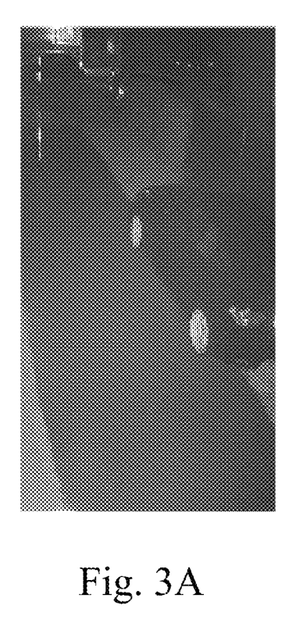
FIGS. 3A to 3B are schematic diagrams of infrared images according to some embodiments of the present disclosure.
Figure 3B:
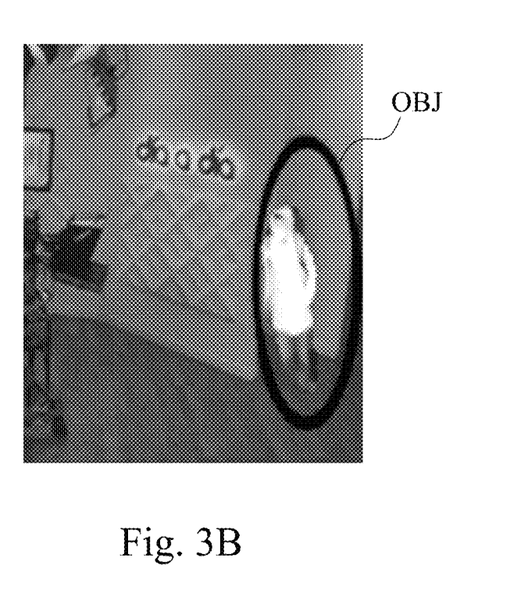

For example, FIGS. 3A to 3B are schematic diagrams of infrared images according to some embodiments of the present disclosure. Referring to FIG. 3A, an image in FIG. 3A is an infrared image that does not include an object of a human shape (i.e., the above-mentioned background image). Referring to FIG. 3B, an image in FIG. 3B is an infrared image (i.e., the above-mentioned object related image) including an object OBJ (i.e., the object of the human shape).

Referring back to FIGS. 1 and 2, in some embodiments, the processor 120 can execute object recognition on the multiple images through the image recognition module 1101. In this way, the processor 120 can identify the at least one object related image including the at least one object from the multiple images through the image recognition module 1101.

In further embodiments, the processor 120 can execute any type of computer vision algorithms through the image recognition module 1101 to execute the object recognition. For example, the above-mentioned computer vision algorithms can be region-based convolutional neural networks (R-CNN) algorithms, single shot detection (SSD) algorithms, or YOLO (you only look once) algorithms, etc. or other similar algorithms or a combination of these algorithms.

Next, in step S203, the processor 120 can capture at least one object image from the at least one object related image through the image processing module 1103.

In other words, the processor 120 can further read the image processing module 1103 from the memory 110 to execute object segmentation from the at least one object related image through the image processing module 1103, thereby capture (or crop) the at least one object image.

In some embodiments, the processor 120 can identify at least one object position of the multiple objects in the at least one object related image through the image recognition module 1101. In this way, the processor 120 can capture the at least one object image from the at least one object related image according to the at least one object position through the image processing module 1103.

In further embodiments, the processor 120 can execute object localization on the at least one object related image through the image recognition module 1101 (e.g., identify a pixel coordinate corresponding to the object in the object related image). In this way, the processor 120 can identify the at least one object position of the multiple objects from the at least one object related image through the image processing module 1103, so as to capture the at least one object image from the at least one object position in the at least one object related image.

In further embodiments, the processor 120 can also execute any of the above-mentioned computer vision algorithms through the image recognition module 1101 to locate the object.

Figure 4A:
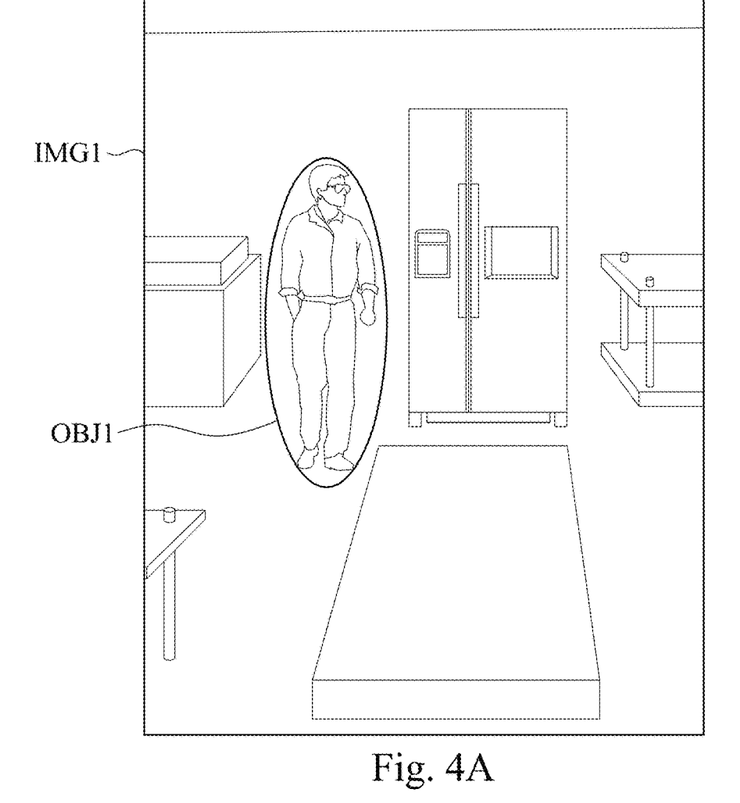
FIGS. 4A to 4B are schematic diagrams of object related images according to some embodiments of the present disclosure.
Figure 4B:
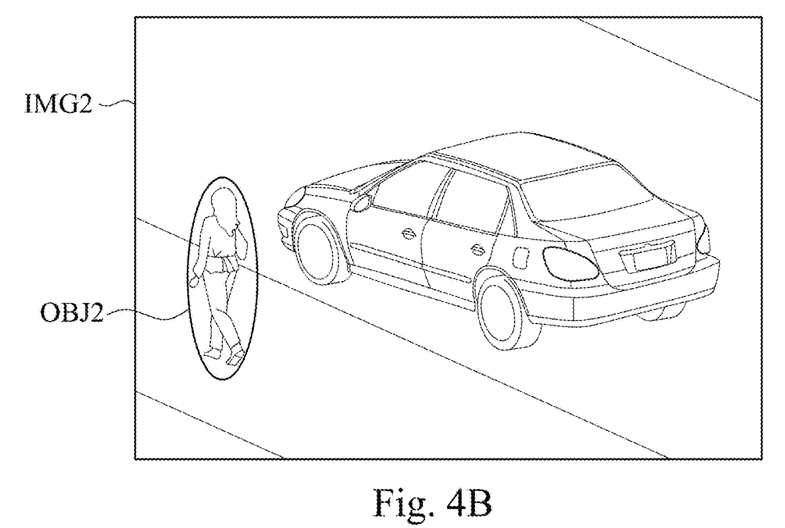

For example, FIGS. 4A to 4B are schematic diagrams of object related images according to some embodiments of the present disclosure. Referring to FIGS. 4A and 4B at the same time, when the user wants to identify an object of a human shape, an object position of an object OBJ1 in an object related image IMG1 can be identified, and an object position of an object OBJ2 in an object related image IMG2 can be identified. Accordingly, the object OBJ1 can be captured from the object position of the object OBJ1 in the object related image IMG1, and the object OBJ2 can be captured from the object position of the object OBJ2 in the object related image IMG2. In this way, the object OBJ1 and the object OBJ2 can be used as object images.

Finally, referring back to FIG. 1 and FIG. 2, in step S205, the processor 120 can superimpose the at least one object image on multiple arbitrary positions in the multiple images to generate multiple training sample images through the image processing module 1103, and use the multiple training sample images to execute machine learning through the training module 1105.

In other words, the processor 1 can further randomly superimpose the at least one object image on the multiple images through the image processing module 1103, so as to superimpose the at least one object image on the multiple arbitrary positions in the multiple images, thereby generating the multiple training sample images for training. In this way, the processor 120 can read the training module 1105 from the memory 110, so as to use the multiple training sample images to execute the machine learning through the training module 1105, thereby training a recognition model corresponding to the image photographed by the night-vision device.

Notably, the processor 120 can use any machine learning algorithms to execute the machine learning through the training module 1105, and there are no particular limitations on the machine learning algorithms.

In some embodiments, the processor 120 can identify the multiple background images from the multiple images through the image recognition module 1101, where the multiple background images do not include the multiple objects. In this way, the processor 120 can superimpose the at least one object image on the multiple arbitrary positions in the multiple background images through the image processing module 1103 to generate the multiple training sample images.

In further embodiments, the processor 120 can also execute any of the above-mentioned computer vision algorithms through the image recognition module 1101 to identify the multiple background images from the multiple images.

Figure 4C:
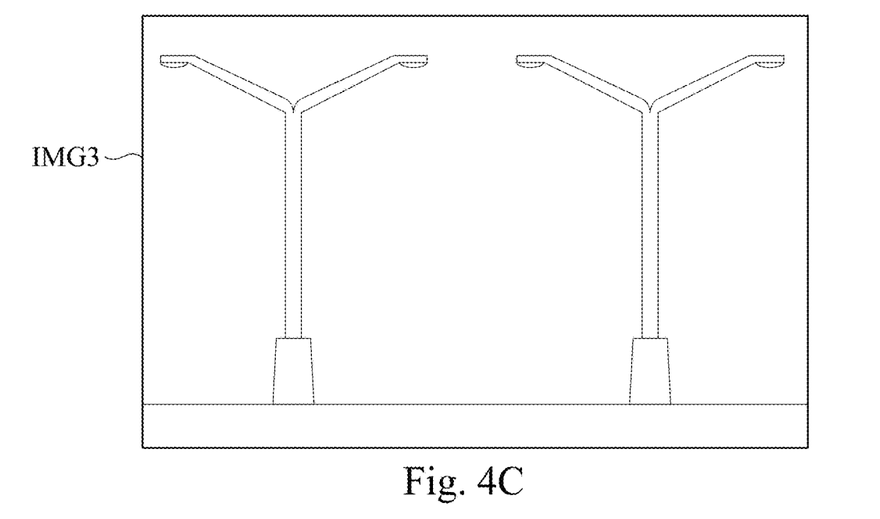
FIG. 4C is a schematic diagram of a background image according to some embodiments of the present disclosure.

For example, FIG. 4C is a schematic diagram of a background image according to some embodiments of the present disclosure. Referring to FIG. 4C, the background image IMG3 does not include any objects of the human shape.

Referring back to FIGS. 1 and 2, in some embodiments, the processor 120 can randomly select at least one superimposed image from the at least one object image through the image processing module 1103, thereby superimposing the at least one superimposed image on the multiple arbitrary positions in the multiple images to generate the multiple training sample images. In other words, the processor 120 can randomly select at least one from the at least one object image through the image processing module 1103 to use the selected at least one as the at least one superimposed image. In other embodiments, the processor 120 can superimpose the at least one superimposed image on the multiple arbitrary positions in the multiple above-mentioned background images through the image processing module 1103 to generate the multiple training sample images.

In some embodiments, the processor 120 can execute multiple geometric transformation processes on the at least one superimposed image through the image processing module 1103 to generate multiple transformed images, thereby superimposing the at least one superimposed image and the multiple transformed images on the multiple arbitrary positions in the multiple images to generate the multiple training sample images. In other embodiments, the processor 120 can superimpose the at least one superimposed image and the multiple transformed images to the multiple arbitrary positions in the multiple background images through the image processing module 1103 to generate the multiple training sample images.

Notably, the above-mentioned geometric transformation process can be a rotation process, a mirroring process, or a scaling process, etc., and there is not particular limitation.

Figure 4D:
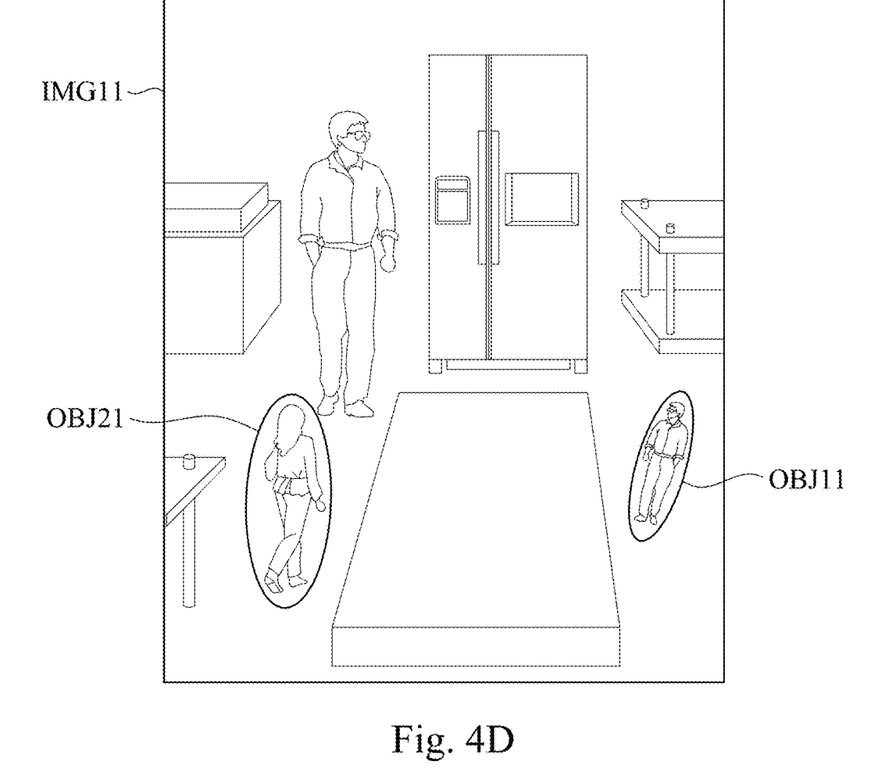
FIGS. 4D to 4E are schematic diagrams of training sample images according to some embodiments of the present disclosure.

For example, FIGS. 4D to 4E are schematic diagrams of training sample images according to some embodiments of the present disclosure. Referring to FIG. 4A, FIG. 4B and FIG. 4D at the same time, the object OBJ1 and the object OBJ2 can be used as the object image when the user wants to identify a object of the human shape and capture the object OBJ1 and the object OBJ2 from the object related image IMG1 and the object related image IMG2 respectively. In this way, at least one of the object OBJ1 and the object OBJ2 can be randomly selected as the superimposed image.

Taking the simultaneous selection of object OBJ1 and object OBJ2 as the superimposed images as an example, the object OBJ2 can be scaled to generate object OBJ21, and the object OBJ1 can be rotated, mirrored, and scaled to generate object OBJ11, thus the object OBJ21 and the object OBJ11 can be superimposed on two arbitrary positions in the object related image IMG1 to generate a training sample image IMG11.

Figure 4E:
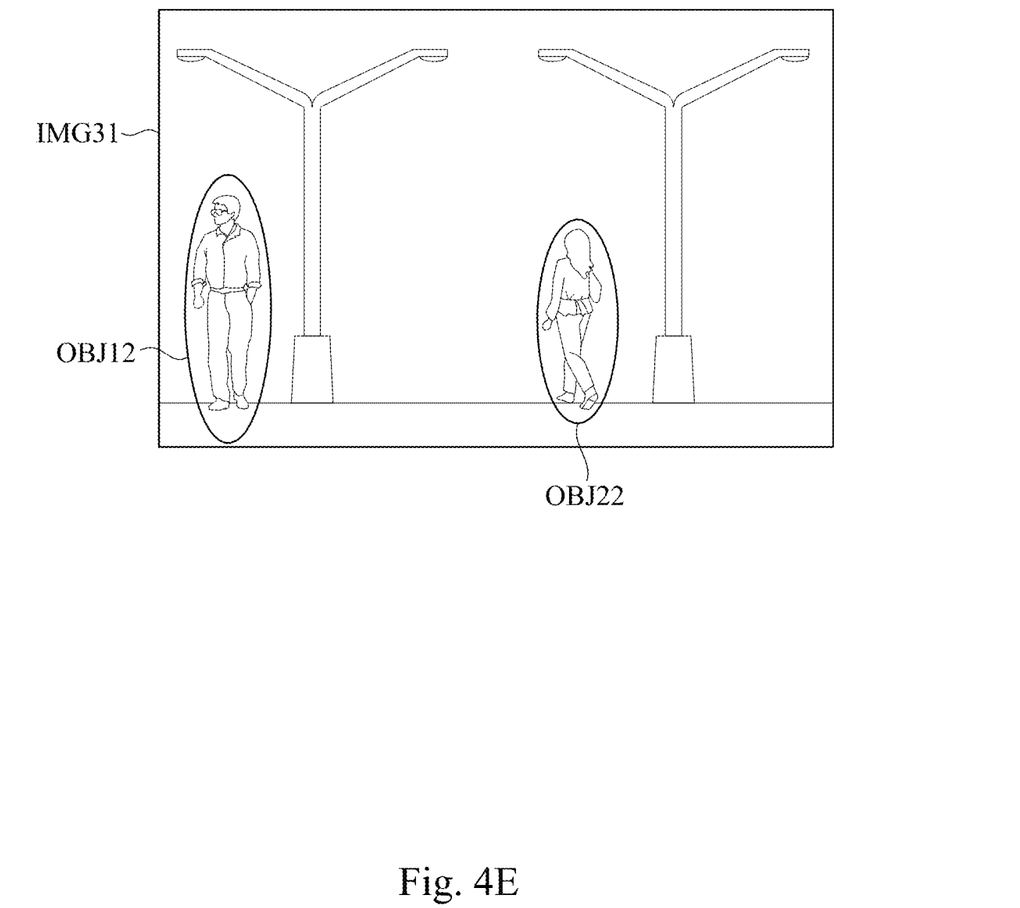

In addition, referring to FIG. 4A, FIG. 4B and FIG. 4E at the same time, The object OBJ2 can also be scaled to generate the object OBJ22, and the object OBJ1 can be mirrored to generate the object OBJ12, thus the object OBJ22 and the object OBJ12 can be superimposed on two arbitrary positions in the background image IMG3 to generate a training sample image IMG31.

Referring back to FIG. 1 and FIG. 2, in some embodiments, the processor 120 can determine whether there is at least one erroneous image in the multiple training sample images through the image recognition module 1101. The processor 120 can delete the at least one erroneous image through the image processing module 1103 when the processor 120 determines, through the image recognition module 1101, that there is the at least one erroneous image in the multiple training sample images.

In further embodiments, the erroneous image can be various abnormal images which are images including at least one object not superimposed on the ground, images including at least one object upside down, or images including at least two objects superimposed on each other, etc.

Figure 5A:
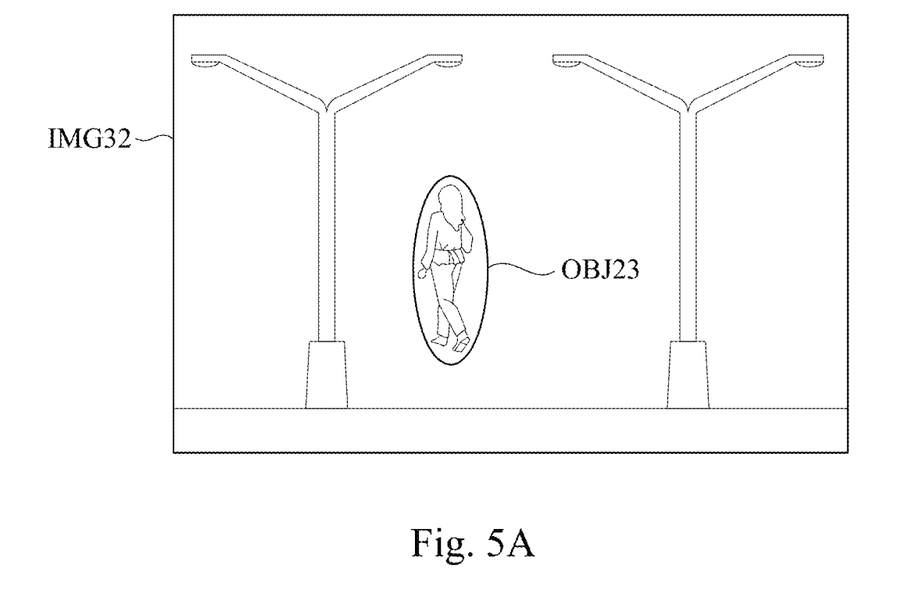
FIGS. 5A to 5C are schematic diagrams of error images according to other embodiments of the present disclosure.
Figure 5B:
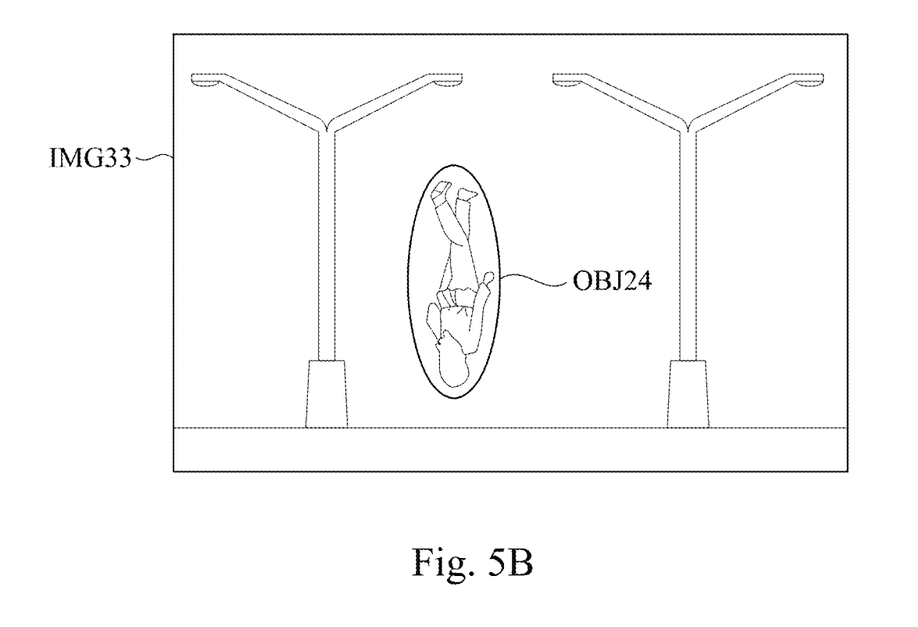
Figure 5C:
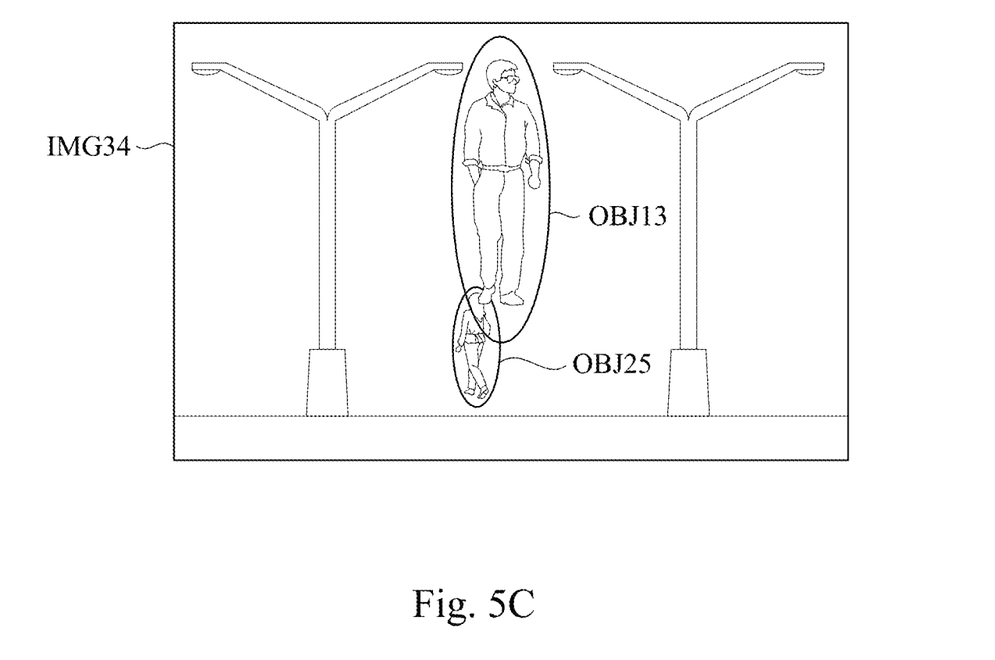

For example, FIGS. 5A to 5C are schematic diagrams of error images according to other embodiments of the present disclosure. Referring to FIG. 5A, a training sample image IMG32 includes an object OBJ23 that is not superimposed on the ground. Referring to FIG. 5B, a training sample image IMG33 includes an object OBJ24 that is upside down. Referring to FIG. 5C, a training sample image IMG34 includes an object OBJ13 and an object OBJ25 that are superimposed on each other.

Through the above steps, the image data augmentation device of the embodiment of the present disclosure can execute data augmentation on the image photographed by the night-vision device to generate the recognition model corresponding to the image photographed by the night-vision device. In this way, it is possible to avoid the poor recognition accuracy caused by using the model trained by the color image to execute object recognition on the image photographed by the night-vision device.

Referring back to FIG. 1, taking the embodiment of training on the images photographed by a generally common camera device as an example, similarly, after the generally common camera device photographs multiple images, the memory 110 stores the photographed images, and the image data augmentation device 100 uses the photographed images for data augmentation, thereby increasing a quantity of data for training the recognition model.

Figure 6:
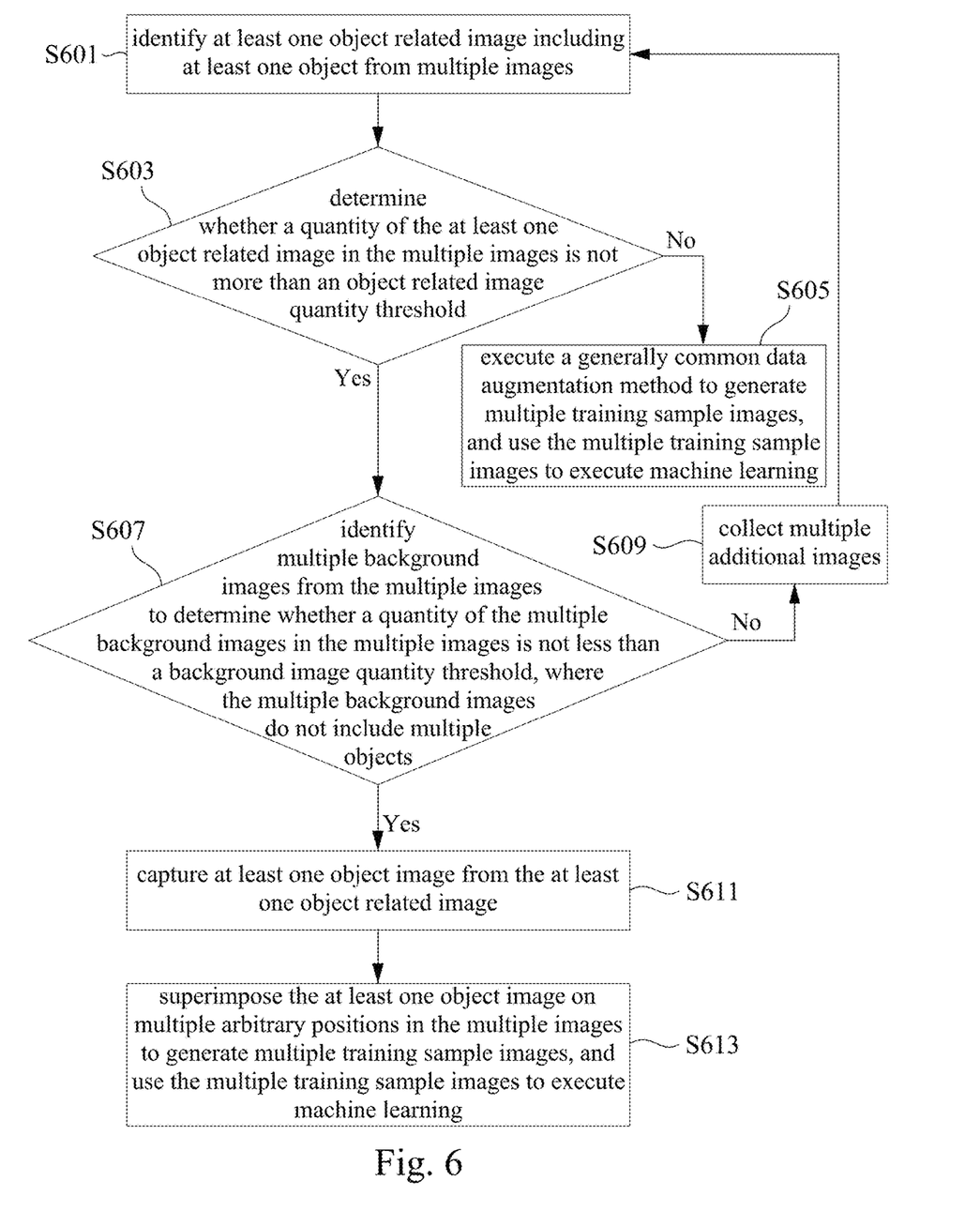
FIG. 6 is a flowchart of an image data augmentation method according to other embodiments of the present disclosure.

FIG. 6 is a flowchart of an image data augmentation method according to other embodiments of the present disclosure. The method of the embodiment shown in FIG. 6 is applicable to the image data augmentation device 100 of FIG. 1, but is not limited to this. For the sake of convenience and clarity, the following refers to FIG. 1 and FIG. 6 at the same time, and the detailed steps of the image data augmentation method shown in FIG. 6 are explained by the operation relationship between the components in the image data augmentation device 100.

First, a difference between FIG. 6 and FIG. 2 is that, after the processor 120 identifies at least one object related image including at least one object from the multiple images through the image recognition module 1101 (i.e., step S601), the processor 120 can execute a determination in step S603 through the image recognition module 1101 to determine whether to execute the generally common data augmentation method. If the generally common data augmentation method is not executed, the determination in step S607 is executed to determine whether to continue to execute the image data amplification method of FIG. 2.

In detail, in step S603, the processor 120 can determine, through the image recognition module 1101, whether a quantity of the at least one object related image in the multiple images is not more than an object related image quantity threshold. If yes, execute step S607. Otherwise, if not, execute step S605.

Next, in step S605, the processor 120 can execute the generally common data augmentation method through the image processing module 1103 to generate multiple training sample images, and use the multiple training sample images to execute machine learning through the training module 1105.

Next, in step S607, the processor 120 can identify multiple background images from the multiple images through the image recognition module 1101 to determine whether a quantity of the multiple background images in the multiple images is not less than a background image quantity threshold, where the multiple background images do not include multiple objects. If yes, execute step S611. Otherwise, if not, execute step S609.

In some embodiments, the above-mentioned object related image quantity threshold and the background image quantity threshold can be pre-stored in the memory 110 or received by the processor 120 from a data server (not shown) immediately.

Next, in step S609, the processor 120 can collect multiple additional images. After the processor 120 collects the multiple additional images, return to execute the step S601.

In some embodiments, the processor 120 can transmit image request information to the data server to receive the multiple additional images from the data server, where the additional images are different from the multiple images stored in the memory 110.

In addition, the rest of the steps of the image data amplification method in FIG. 6 are all the same as the image data amplification method in FIG. 2, so they do not be repeated here.

Through the above steps, when the quantity of stored images including the specific object is insufficient, the image data augmentation device of the embodiment of the present disclosure can execute the data augmentation more efficiently, so as to generate the recognition model corresponding to the image photographed by the generally common camera device. Accordingly, it is possible to avoid poor recognition accuracy caused by only using the recognition model trained from the stored images for recognition.

In summary, the image data augmentation device provided by the present disclosure randomly superimposes the object images captured from the multiple images to the multiple images or the background images in the multiple images to generate the multiple training sample images. Accordingly, the problem of poor recognition accuracy caused by object recognition in the images photographed by the night-vision device using the model trained by color images can be solved, and the problem of poor recognition accuracy caused by only using the recognition model trained from the stored images for recognition can be solved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image data augmentation device, comprising:
   a memory configured to store a plurality of commands and a plurality of images, wherein the plurality of images comprise at least one object related image and a plurality of background images;
   a processor connected to the memory and configured to read the plurality of images and execute the plurality of commands to:
      identify the at least one object related image comprising at least one object from the plurality of images;
      capture at least one object image from the at least one object related image;
      superimpose the at least one object image on a plurality of arbitrary positions in the plurality of background images to generate a plurality of training sample images;
      determine whether the at least one object image is not superimposed on a ground, is upside down, or is superimposed by on another object image so as to determine whether there is at least one erroneous image in the plurality of training sample images; and
      delete the at least one erroneous image from the plurality of training sample images, and using the plurality of training sample images to execute machine learning.

2. The image data augmentation device of claim 1, wherein the plurality of images are captured by a night-vision device, and the processor is further configured to:
   identify at least one object position of the at least one object in the at least one object related image; and
   capture the at least one object image from the at least one object related image according to the at least one object position.

3. The image data augmentation device of claim 1, wherein the processor is further configured to:
   identify the plurality of background images from the plurality of images, wherein the plurality of background images do not comprise the at least one object; and
   superimpose the at least one object image on the plurality of arbitrary positions in the plurality of background images to generate the plurality of training sample images.

4. The image data augmentation device of claim 1, wherein the processor is further configured to:
   select at least one superimposed image from the at least one object image randomly; and
   superimpose the at least one superimposed image on the plurality of arbitrary positions in the plurality of background images to generate the plurality of training sample images.

5. The image data augmentation device of claim 4, wherein the processor is further configured to:
   execute a plurality of geometric transformation processes on the at least one superimposed image to generate a plurality of transformed images; and
   superimpose the at least one superimposed image and the plurality of transformed images on the plurality of arbitrary positions in the plurality of background images to generate the plurality of training sample images.

6. An image data augmentation method, comprising:
   capturing at least one object image from at least one object related image comprising at least one object from a plurality of images, wherein the plurality of images comprise the at least one object related image and a plurality of background images;
   superimposing the at least one object image on a plurality of arbitrary positions in the plurality of background images to generate a plurality of training sample images;
   determining whether the at least one object image is not superimposed on a ground, is upside down, or is superimposed on another object image so as to determine whether there is at least one erroneous image in the plurality of training sample images; and
   deleting the at least one erroneous image from the plurality of training sample images, and using the plurality of training sample images to execute machine learning.

7. The image data augmentation method of claim 6, wherein the plurality of images are captured by a night-vision device, and the step of capturing the at least one object image from the at least one object related image comprising the at least one object from the plurality of images comprises:
   identifying at least one object position of the at least one object in the at least one object related image; and
   capturing the at least one object image from the at least one object related image according to the at least one object position.

8. The image data augmentation method of claim 6, wherein the step of superimposing the at least one object image on the plurality of arbitrary positions in the plurality of background images to generate the plurality of training sample images comprises:
   identifying the plurality of background images from the plurality of images, wherein the plurality of background images do not comprise the at least one object; and
   superimposing the at least one object image on the plurality of arbitrary positions in the plurality of background images to generate the plurality of training sample images.

9. The image data augmentation method of claim 6, wherein the step of superimposing the at least one object image on the plurality of arbitrary positions in the plurality of background images to generate the plurality of training sample images comprises:

selecting at least one superimposed image from the at least one object image randomly; and  superimposing the at least one superimposed image on the plurality of arbitrary positions in the plurality of background images to generate the plurality of training sample images.

10. The image data augmentation method of claim 9, wherein the step of superimposing the at least one superimposed image on the plurality of arbitrary positions in the plurality of background images to generate the plurality of training sample images comprises:

executing a plurality of geometric transformation processes on the at least one superimposed image to generate a plurality of transformed images; and  superimposing the at least one superimposed image and the plurality of transformed images on the plurality of arbitrary positions in the plurality of background images to generate the plurality of training sample images.

11. An image data augmentation device, comprising:

a memory configured to store a plurality of commands and a plurality of images, wherein the plurality of images comprise at least one object related image and a plurality of background images;

a processor connected to the memory and configured to read the plurality of images and execute the plurality of commands to:

identify the at least one object related image comprising at least one object from the plurality of images;

determine whether a quantity of the at least one object related image in the plurality of images is not more than an object related image quantity threshold;

capture at least one object image from the at least one object related image when the quantity of the at least one object related image is not more than the object related image quantity threshold;

superimpose the at least one object image on a plurality of arbitrary positions in the plurality of background images to generate a plurality of training sample images;

determine whether the at least one object image is not superimposed on a ground, is upside down, or is superimposed on another object image so as to determine whether there is at least one erroneous image in the plurality of training sample images; and   delete the at least one erroneous image from the plurality of training sample images, and using the plurality of training sample images to execute machine learning.

12. The image data augmentation device of claim 11, wherein the processor is further configured to:

identify the plurality of background images from the plurality of images to determine whether a quantity of the background images in the plurality of images is not less than a background image quantity threshold, wherein the plurality of background images do not comprise the at least one object;

identify at least one object position of the at least one object in the at least one object related image when the quantity of the plurality of background images in the plurality of images is not less than the background image quantity threshold; and  capture the at least one object image from the at least one object related image according to the at least one object position.

13. The image data augmentation device of claim 12, wherein the processor is further configured to:

superimpose the at least one object image on the plurality of arbitrary positions in the plurality of background images to generate the plurality of training sample images.

14. The image data augmentation device of claim 11, wherein the processor is further configured to:

select at least one superimposed image from the at least one object image randomly; and  superimpose the at least one superimposed image on the plurality of arbitrary positions in the plurality of background images to generate the plurality of training sample images.

15. The image data augmentation device of claim 14, wherein the processor is further configured to:

execute a plurality of geometric transformation processes on the at least one superimposed image to generate a plurality of transformed images; and  superimpose the at least one superimposed image and the plurality of transformed images on the plurality of arbitrary positions in the plurality of background images to generate the plurality of training sample images.

\* \* \* \* \*